United States Patent
Baumann et al.

(10) Patent No.: US 8,952,256 B2
(45) Date of Patent: Feb. 10, 2015

(54) STATOR BAR

(75) Inventors: Thomas Baumann, Wettingen (CH); Massimiliano Vezzoli, Remigen (CH); Dieter Stoll, Mellingen (CH); Johann Haldemann, Birr (CH)

(73) Assignee: Alstom Technology Ltd., Baden (CH)

( * ) Notice: Subject to any disclaimer, the term of this patent is extended or adjusted under 35 U.S.C. 154(b) by 348 days.

(21) Appl. No.: 13/173,632

(22) Filed: Jun. 30, 2011

(65) Prior Publication Data
US 2012/0001514 A1 Jan. 5, 2012

(30) Foreign Application Priority Data
Jul. 2, 2010 (EP) .................................... 10168235

(51) Int. Cl.
F16B 33/00 (2006.01)
F16B 37/00 (2006.01)
H01B 17/14 (2006.01)
H01F 27/32 (2006.01)
H01B 3/00 (2006.01)
H02K 3/40 (2006.01)
H02K 3/14 (2006.01)

(52) U.S. Cl.
CPC ... H02K 3/40 (2013.01); H02K 3/14 (2013.01)
USPC .................. 174/138 R; 174/138 C; 174/138 E

(58) Field of Classification Search
USPC ......... 174/137 R, 138 R, 138 C, 138 E, 18 R; 310/215, 53; 62/505, 434
See application file for complete search history.

(56) References Cited

U.S. PATENT DOCUMENTS

| 6,072,259 | A | * | 6/2000 | Kawabata et al. | 310/216.115 |
| 6,404,092 | B1 | * | 6/2002 | Baumann et al. | 310/201 |
| 6,750,400 | B2 | * | 6/2004 | Younsi et al. | 174/110 R |
| 2002/0029897 | A1 | | 3/2002 | Younsi et al. | |
| 2009/0174278 | A1 | * | 7/2009 | Sheaffer et al. | 310/201 |

FOREIGN PATENT DOCUMENTS

| DE | 198 11 370 A1 | 9/1999 |
| EP | 0 951 132 A2 | 10/1999 |
| FR | 2 290 071 | 5/1976 |
| WO | WO 2007/139490 A1 | 12/2007 |

OTHER PUBLICATIONS

European Search Report for EP 10168235 dated May 11, 2011.
R.H. Rehder et al., "Corona Deterioration Reduction in Large Electrical Machine Insulation", IEEE Industry Applications Magazine, Jan. 1, 1995, pp. 12-15, vol. 1, No. 1.

* cited by examiner

*Primary Examiner* — Tuan T Dinh
*Assistant Examiner* — Ahmad D Barnes
(74) *Attorney, Agent, or Firm* — Buchanan Ingersoll & Rooney PC

(57) ABSTRACT

A high voltage stator bar includes a substantially quadrangular conductive element made of a plurality of interwoven strands, and an electric insulation applied around the conductive element. The permittivity at the corners of the electric insulation decreases by less than 60% from an inner insulation zone facing the conductive element towards an outer insulation zone.

9 Claims, 3 Drawing Sheets

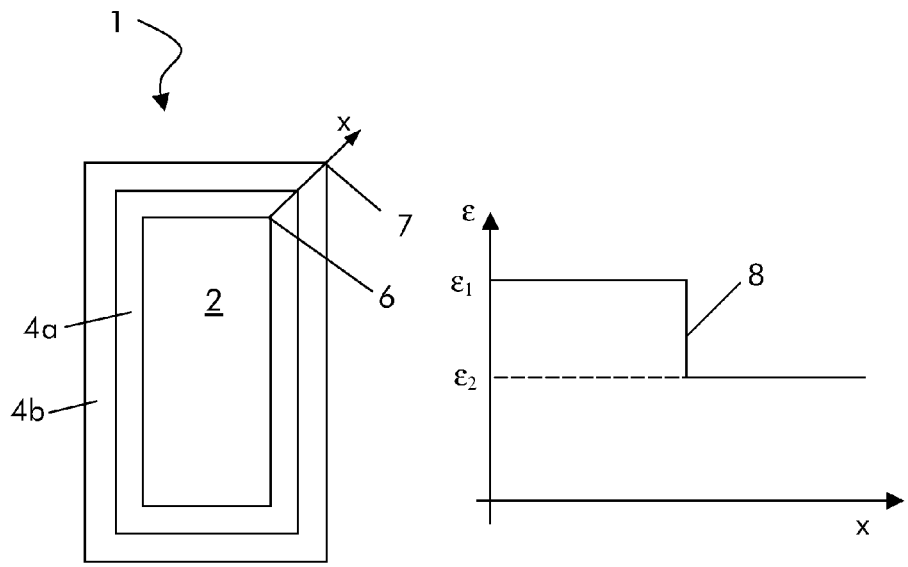
Fig. 2
Fig. 3
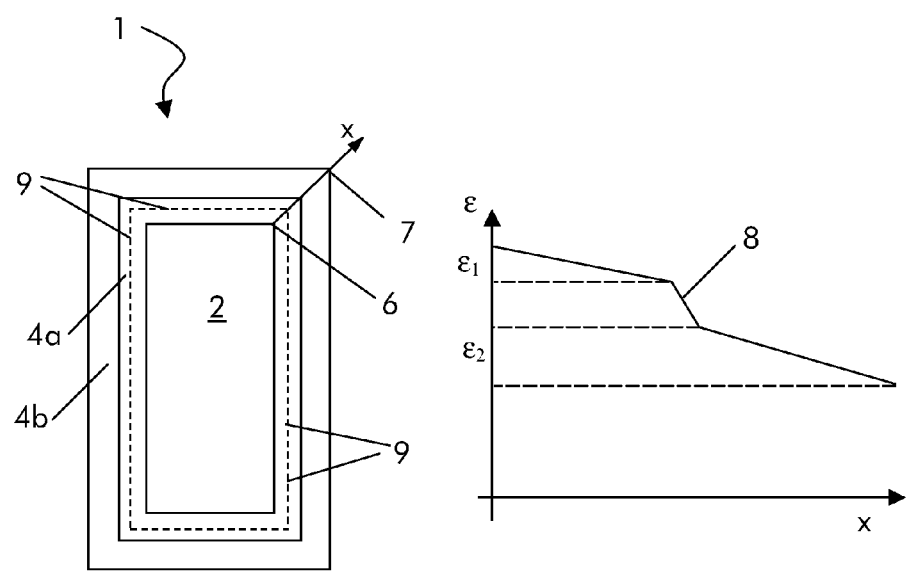
Fig. 4
Fig. 5

STATOR BAR

RELATED APPLICATION

This application claims priority under 35 U.S.C. §119 to European Patent Application No. 10168235.9 filed in Europe on Jul. 2, 2010, the entire content of which is hereby incorporated by reference in its entirety.

FIELD

The present disclosure relates to a stator bar of a large rotating electric machine such as a generator, for example, an indirectly cooled generator with more than 100 MW output power and a nominal voltage greater than 10 kVAC.

BACKGROUND INFORMATION

Stator bars are known to include a plurality of interwoven conductive copper strands defining a conductive element (e.g., the so-called green bar) having a rectangular shape (plain Roebel bars).

This bar is covered with insulation which can be made of a mica tape impregnated with a resin (insulated Roebel bar), for example.

Because of the rectangular shape, four sharp corners are defined, which during operation generate very high electrical field peaks. These peaks limit the maximum electric voltage that can be applied to the stator bars and, in turn, limit the achievable power.

In order to reduce the electrical field peaks, it is known to round the corners of the conductive element, such that a radius between 0.5-2.5 millimeters is achieved.

The beneficial effect of the rounding is quite high when the radius is small, but when increasing the radius the beneficial effect decreases. For a radius of about 2.5 millimeters, the beneficial effect cannot be practically further improved in this way.

In order to reduce the electrical field peaks at the corners of the stator bars, WO 2007/139,490 discloses to vary the insulation permittivity in the circumferential direction, such that the insulation has a higher permittivity at its corners.

Since the permittivity is only regulated in the circumferential direction, an insulation such as that disclosed in WO 2007/139,490 does not efficiently use the dielectric material constituting it.

In addition, DE 198 11 370 discloses to vary the insulation permittivity in the radial direction.

With reference to the insulation permittivity, model calculations showed that when the ratio $$\epsilon_{(corners)}/\epsilon_{(elsewhere)}$$

between the insulation permittivity at the corners (close to the conductive element) and the insulation permittivity elsewhere (in the radial direction) is greater than an optimum value, an electric field is induced at the transition that may be higher than the electric field at the corners (close to the conductive element) with insulation having a uniform permittivity (i.e., a single permittivity value).

It is clear that in this case no real improvement is achieved, since a very high electric field actually exists in the insulation.

SUMMARY

An exemplary embodiment of the present disclosure provides a stator bar which includes a substantially quadrangular conductive element made of a plurality of interwoven strands, and an electric insulation applied around the conductive element. The electric insulation includes a plurality of corners corresponding to corners of the conductive element. The electric insulation includes an inner insulation zone facing the conductive element, and an outer insulation zone surrounding the inner insulation zone. Permittivity at the corners of the electric insulation decreases by less than 60% from the inner insulation zone facing the conductive element towards the outer insulation zone, and the radius of at least one of the corners is less than 3 millimeters.

BRIEF DESCRIPTION OF THE DRAWINGS

Additional refinements, advantages and features of the present disclosure are described in more detail below with reference to exemplary embodiments illustrated in the drawings, in which:

FIGS. 2 and 3 respectively show a stator bar and the corresponding permittivity run in the direction of maximum field in accordance with an exemplary embodiment of the present disclosure with two different mica tapes;

FIGS. 4 and 5 respectively show a stator bar and the corresponding permittivity run in the direction of maximum field in accordance with an exemplary embodiment of the present disclosure with mica tapes including different amounts of high permittivity particles;

DETAILED DESCRIPTION

Figure 1:
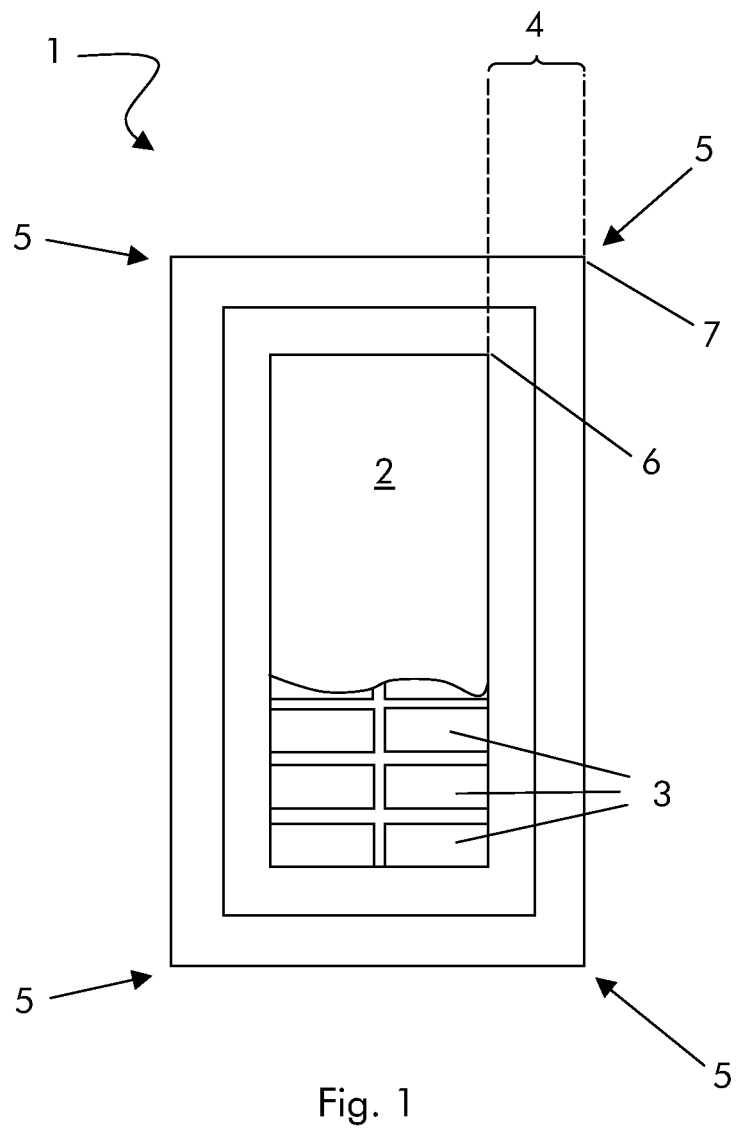
FIG. 1 shows a stator bar in accordance with an exemplary embodiment of the present disclosure.

Exemplary embodiments of the present disclosure provide a stator bar which eliminates the drawbacks to conventional stator bards. For instance, exemplary embodiments of the present disclosure provide a stator bar having reduced electric field peaks at the conductive element corners, which are generally the most electrically stressed zones of the stator bar.

Exemplary embodiments of the present disclosure also provide a stator bar in which the dielectric material is efficiently used, such that high permittivity insulation is only used where needed.

Exemplary embodiments of the present disclosure are illustrated in the drawings, in which a stator bar (for example, a high voltage stator bar) is generally indicated by reference symbol 1.

The stator bar 1 includes a substantially quadrangular conductive element 2 made of a plurality of interwoven strands 3 (green bar) and an electric insulation 4 applied around the conductive element 2 to define a main insulation of the stator bar 1.

The electric insulation 4 has a permittivity at its corners 5 that decreases from an inner insulation zone 6 facing the conductive element 2 towards an outer insulation zone 7. As illustrated in the exemplary embodiment, the outer insulation zone 7 surrounds the inner insulation zone 6 facing the conductive element 2.

Figure 8:
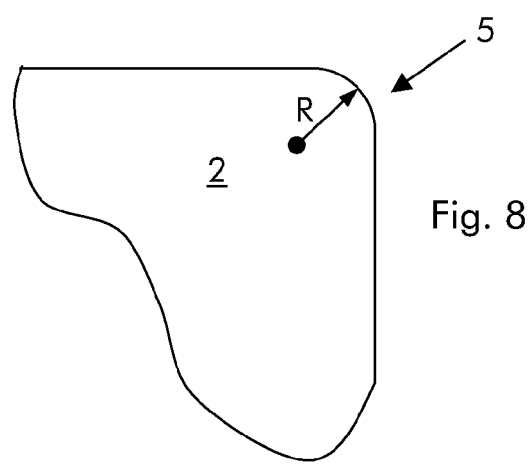
FIG. 8 shows a corner of a conductive element or green bar in accordance with an exemplary embodiment of the present disclosure.

Change in permittivity also depends on the radius R of the corners 5 (see FIG. 8), since the radius R influences the electric field.

In accordance with an exemplary embodiment, the permittivity decreases by less than 60% when the radius R of the corner 5 is less than 3 millimeters. For example, the permittivity decreases between 35-45% when the corner radius R is between 1.5-2.5 millimeters.

As known, the higher the permittivity, the lower the electric field in a dielectric material; thus since the electric field around a stator bar 1 is higher at the corners 5 and in particular in the corner zones close to the conductive element 2, a permittivity increase only in those zones achieves a reduction in the electric field peaks, without reducing the overall permittivity and thus the overall electric field, which improves the power performances.

The selected differential permittivity between the zones 6 and 7 allows for an electric field to be generated at the transition zone between the dielectric materials having different permittivity that is generally limited and, for example, smaller than the electric field peaks generated when the insulation 4 has only one permittivity value.

If, however, the difference in permittivity exceeds the values of 60% given above, a peak in the electrical field may appear at the transition from the inner insulation zone 6 to the outer insulation zone 7, which exceeds the field in an insulation 4 with only one permittivity value.

In accordance with an exemplary embodiment, the insulation 4 can include a mica tape impregnated with a resin.

Additional features of exemplary embodiments of the present disclosure are described in the following. It will be clear that additional embodiments are also possible based on the technical features of the present disclosure.

FIG. 2 illustrates an exemplary embodiment in which the insulation 4 includes a first mica tape 4a wrapped around the conductive element 2 and a second mica tape 4b wrapped around the first mica tape 4a.

In this exemplary embodiment, the first mica tape permittivity $\in_1$ is higher than the second mica tape permittivity $\in_2$.

According to an exemplary embodiment, the first mica tape 4a and the second mica tape 4b are made of different types of mica having different permittivity.

For example, the first mica tape 4a can be made of muscovite mica, and the second mica tape 4b can be made of phlogopite mica.

FIG. 3 shows the permittivity run in the direction of maximum field (being the radial direction x) through the insulation 4.

In this exemplary embodiment, the insulation 4 has the first permittivity $\in_1$ at the inner insulation zones 6 of the insulation 4 close to the conductive element 2; this part of the insulation 4 is made of the first mica tape 4a.

In contrast, the outer insulation zones 7 of the insulation 4 are made of the second mica tape 4b and have a lower permittivity $\in_2$.

A permittivity step 8 is defined between the permittivity values $\in_1$ and $\in_2$.

FIG. 4 illustrates an exemplary embodiment where, instead of different micas, the first mica tape 4a at the inner insulation zones 6 close to the conductive element 2 includes particles 9 having high permittivity, and the second mica tape 4b at the outer insulation zones 7 has a lower amount or no particles 9. In the illustrated exemplary embodiment, only the mica tape 4a is shown as having the particles 9.

In accordance with an exemplary embodiment, these particles 9 can be $Al_2O_3$ particles, for example.

The permittivity varies as shown in FIG. 5, which illustrates that the permittivity runs in the direction of maximum field being the radial direction x. As shown in the example of FIG. 5, the permittivity is not constant through the insulation 4 but it has two gradually decreasing areas with a kind of step 8 in-between.

Figures 6, 7:
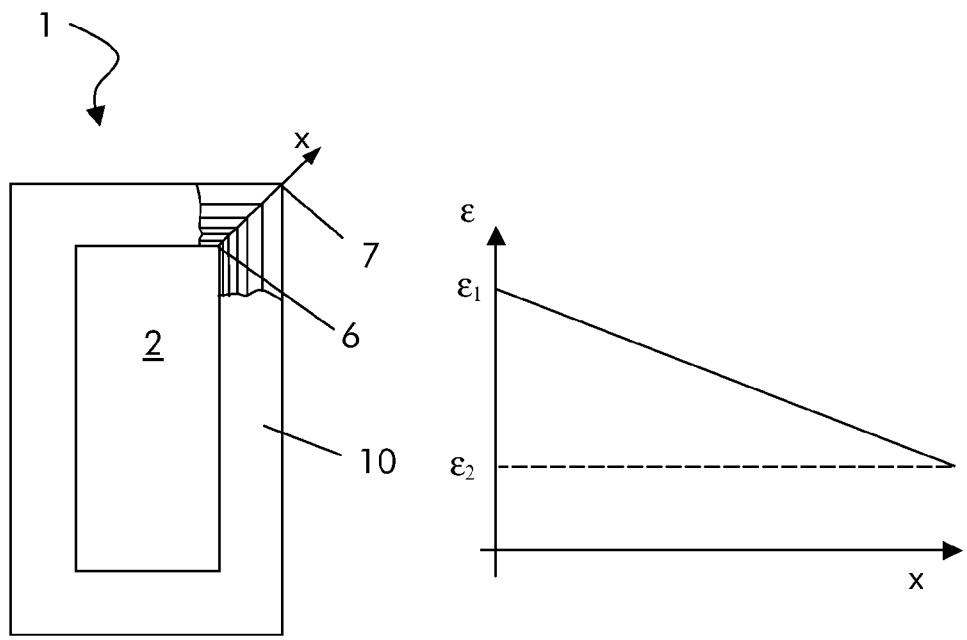
FIGS. 6 and 7 respectively show a stator bar and the corresponding permittivity run in the direction of maximum field in an embodiment of the disclosure with mica tapes with a wrapping tension that varies during wrapping.

FIG. 6 illustrates an exemplary embodiment in which the different permittivity through the insulation 4 is achieved by changing the resin content of the mica tape 10.

For instance, since the resin has a much lower permittivity than the mica, reducing its amount increases the insulation permittivity.

For example, the inner insulation zones 6 close to the conductive element 2 have a lower resin content than the insulation at the outer insulation zones 7.

In order to achieve different resin contents, the mica tape 10 constituting the insulation 4 may be wrapped with different wrapping tension.

In accordance with an exemplary embodiment, if the wrapping tension is higher at the beginning and lower at the end of the wrapping, the mica tape at the inner insulation zones 6 is more compressed than the following mica tape at the outer insulation zones 7, which causes the resin to be pressed out from the mica tape at the zones 6 in a larger amount than from the mica tape at the zones 7. Therefore, the resin is retained in the outer insulation zones 7 in a greater amount than in the inner insulation zones 6.

By optimized controlling of the wrapping tension, the permittivity in the insulation may define one or more steps or may at least partly continuously decrease. For example, FIG. 7 shows that the permittivity runs in the direction of maximum field being the radial direction x.

Alternatively, changing of the resin content to change the insulation permittivity can be achieved using mica tapes having different compressibility.

Additionally, strips of mica tape that are not wrapped but aligned parallel to the corners of the conductive element can also be used to change the resin content and, thus, to achieve a change in permittivity.

Naturally the features described may be independently provided from one another.

In practice, the materials used and the dimensions can be chosen at will according to requirements and to the state of the art.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

REFERENCE NUMBERS 1 stator bar
2 conductive element
3 strands
4 insulation
4a first mica tape
4b second mica tape
5 corner
6 inner insulation zone
7 outer insulation zone
8 step
9 high permittivity particles
10 mica tape
$\in$, $\in_1$, $\in_2$ permittivity
x radial direction
R radius

What is claimed is:

1. A stator bar comprising:
a substantially quadrangular conductive element made of a plurality of interwoven strands; and
an electric insulation applied around the conductive element and including a plurality of corners corresponding to corners of the conductive element, the electric insulation including an inner insulation zone facing the conductive element, and an outer insulation zone surrounding the inner insulation zone, a radius of at least one of the corners being 1.5-2.5 millimeters,
wherein permittivity at the corners of the electric insulation decreases by 35-45% from the inner insulation zone facing the conductive element towards the outer insulation zone,
wherein the insulation comprises a mica tape impregnated with a resin, and
wherein the mica tape at the inner insulation zone has a lower resin content than the mica tape at the outer insulation zone.

2. The stator bar as claimed in claim 1, wherein the mica tape includes a plurality of mica tapes having different compressibility to achieve different resin content.

3. The stator bar as claimed in claim 1, wherein the mica tape includes strips of mica tape that parallel to the corners of the conductive element to achieve a different resin content.

4. The stator bar as claimed in claim 1, wherein the permittivity defines at least a step.

5. The stator bar as claimed in claim 1, wherein the permittivity decreases at least partly continuously in a radial direction.

6. A generator comprising the stator bar as claimed in claim 1,
wherein the generator has more than 100 MW output power and a nominal voltage greater than 10 kVAC.

7. A stator bar comprising:
a substantially quadrangular conductive element made of a plurality of interwoven strands; and
an electric insulation applied around the conductive element and including a plurality of corners corresponding to corners of the conductive element, the electric insulation including an inner insulation zone facing the conductive element, and an outer insulation zone surrounding the inner insulation zone, a radius of at least one of the corners being 1.5-2.5 millimeters,
wherein permittivity at the corners of the electric insulation decreases by 35-45% from the inner insulation zone facing the conductive element towards the outer insulation zone,
wherein the insulation comprises a mica tape impregnated with a resin,
wherein the mica tape is wrapped with different wrapping tension to achieve different resin content, and
wherein the wrapping tension is higher at the beginning of the wrapping and lower at the end of wrapping.

8. The stator bar as claimed in claim 7, wherein the permittivity defines at least a step.

9. The stator bar as claimed in claim 7, wherein the permittivity decreases at least partly continuously in a radial direction.

* * * * *